(12) United States Patent
Grinis et al.

(10) Patent No.: US 12,197,484 B2
(45) Date of Patent: Jan. 14, 2025

(54) SYSTEM AND METHOD FOR GENERATING A MULTI-LABEL CLASSIFIER FOR TEXTUAL COMMUNICATIONS

(71) Applicant: GONG.io Ltd., Ramat Gan (IL)

(72) Inventors: Igal Grinis, Hod Hasharon (IL); Inbal Horev, Tel Aviv (IL); Raquel Sitman, Tel Aviv (IL); Omri Allouche, Tel Aviv (IL)

(73) Assignee: GONG.io Ltd., Ramat Gan (IL)

( * ) Notice: Subject to any disclaimer, the term of this patent is extended or adjusted under 35 U.S.C. 154(b) by 379 days.

(21) Appl. No.: 17/656,730

(22) Filed: Mar. 28, 2022

(65) Prior Publication Data

US 2023/0306051 A1    Sep. 28, 2023

(51) Int. Cl.
| | | |
|---|---|---|
| *G06F 40/30* | (2020.01) | |
| *G06F 16/35* | (2019.01) | |
| *G06F 16/383* | (2019.01) | |
| *G06F 18/214* | (2023.01) | |
| *G06F 40/284* | (2020.01) | |
| *G06N 3/04* | (2023.01) | |

(52) U.S. Cl.
CPC .......... *G06F 16/358* (2019.01); *G06F 16/383* (2019.01); *G06F 18/214* (2023.01); *G06F 40/284* (2020.01); *G06F 40/30* (2020.01); *G06N 3/04* (2013.01)

(58) Field of Classification Search
CPC ....... G06F 16/358; G06F 16/383; G06F 40/30
See application file for complete search history.

(56) References Cited

U.S. PATENT DOCUMENTS

| | | |
|---|---|---|
| 7,574,409 B2 | 8/2009 | Patinkin |
| 8,214,242 B2 | 7/2012 | Agapi et al. |
| 2009/0119095 A1 | 5/2009 | Beggelman et al. |
| 2011/0302111 A1* | 12/2011 | Chidlovskii ........... G06N 20/00 706/46 |
| 2017/0083507 A1 | 3/2017 | Ho et al. |
| 2020/0167429 A1* | 5/2020 | Katz ...................... G06F 17/10 |
| 2020/0265102 A1 | 8/2020 | Ho et al. |
| 2021/0027772 A1 | 1/2021 | Horev et al. |

FOREIGN PATENT DOCUMENTS

WO         2019016119 A1     1/2019

* cited by examiner

*Primary Examiner* — Ibrahim Siddo
(74) *Attorney, Agent, or Firm* — M&B IP Analysts, LLC (57) ABSTRACT

A system and method for generating a multi-label classifier of textual data is presented. The method includes training a plurality of single-label classifiers, wherein each of the plurality of single-label classifiers is trained to classify textual data to a single predefined revenue-based label; and training the multi-label classifier using labeled data output by the plurality of single-label classifiers, wherein the multi-label classifier is trained to classify textual data to a vector including revenue-based labels and their respective classification scores.

17 Claims, 6 Drawing Sheets

SYSTEM AND METHOD FOR GENERATING A MULTI-LABEL CLASSIFIER FOR TEXTUAL COMMUNICATIONS

TECHNICAL FIELD

The present disclosure relates generally to processing textual data, more specifically to techniques for identifying, labeling, and tracking concepts in textual data.

BACKGROUND

In sales organizations, especially these days, meetings are conducted via teleconference or videoconference calls. Further, emails are the primary communication means for exchanging letter offers, follow-ups, and so on. In many organizations, sales calls are recorded and transcribed into textual data. Such textual data of transcribed calls, emails, and the like, are stored as corpus for subsequent review. It has been identified that such corpus pertains valuable information about the sales including, but not limited to, trend, process, progress, approaches, tactics, and more. However, due to the complexity and the sheer volume of records, reviewing these records and moreover, to derive insights is challenging and time-consuming, and in return, most of the information cannot be exploited.

Extraction of sales information from records such as calls, meetings, emails, and the like, have been performed by, for example, identification of keywords or phrases in conversations saved in the textual corpus. Identification of keywords may flag meaningful conversations to follow-up on or provide further processing and analysis. For example, identifying the word "expensive" may be utilized to improve sales process.

Current approaches to identify keywords or phrases in textual data are primarily based on textual searches or natural language processing (NLP) techniques. However, such solutions suffer from limitations, for example, the accuracy of identification of keywords and identification of keywords having a certain context. The accuracy of such identification is limited in that searches are performed based on keywords listed in a predefined dictionary.

Moreover, identification of keywords without understanding the context may results in incomplete identification of similar keywords or identification of irrelevant keywords. For example, in a sales conversation, the word "expensive" may be mentioned during a small talk as "I had an expensive dinner last night" or in the context of the conversation "your product is too expensive." In a keyword search, both sentences may be detected upon searching "expensive," but only one of them can be utilized to derive insights with respect to an organization trying to sell a product. Further, the meaning of "expensive" may be described using different words, such as "I cannot afford this product." In such case, the sentence would not be detected by conventional solutions of applying keyword searches since the word "expensive" is not explicitly used.

Such limitations of keyword identification methods can be more apparent in concise communications, such as email communications, which often include a relatively smaller pool of words. Textual data corresponding to such concise communications may not include specific keywords or phrases listed in the predefined dictionary, resulting possible loss of valuable information.

To this end, machine learning algorithms are being implemented to design language models that are capable of contextual understanding of textual data. However, due to the complexity of language and communications, training of such language models often requires an extensively large amount of data and resources that takes much time to process. Moreover, it may be desired to generate language models for particular areas, industries, or cultures in order to effectively analyze the textual data in consideration of distinct terminologies and meanings. However, generating such targeted language models faces challenges in the limited amount of data, resources, and time.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a multi-label classifier of textual data. The method comprises: training a plurality of single-label classifiers, wherein each of the plurality of single-label classifiers is trained to classify textual data to a single predefined revenue-based label; and training a multi-label classifier using labeled data output by the plurality of single-label classifiers, wherein the multi-label classifier is trained to classify textual data to a vector including revenue-based labels and their respective classification scores.

Certain embodiments disclosed herein also include a non-transitory computer readable medium having stored thereon causing a processing circuitry to execute a process, the process comprising: training a plurality of single-label classifiers, wherein each of the plurality of single-label classifiers is trained to classify textual data to a single predefined revenue-based label; and training a multi-label classifier using labeled data output by the plurality of single-label classifiers, wherein the multi-label classifier is trained to classify textual data to a vector including revenue-based labels and their respective classification scores.

Certain embodiments disclosed herein also include a system for generating a multi-label classifier of textual data. The system comprises: a processing circuitry; and a memory, the memory containing instructions that, when executed by the processing circuitry, configure the system to: train a plurality of single-label classifiers, wherein each of the plurality of single-label classifiers is trained to classify textual data to a single predefined revenue-based label; and train a multi-label classifier using labeled data output by the plurality of single-label classifiers, wherein the multi-label classifier is trained to classify textual data to a vector including revenue-based labels and their respective classification scores.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system of generating and training a multi-label classifier for contextual identification and labeling of textual communications. A multi-label classifier is created based on a plurality of trained single-label classifiers to contextualize, classify, and label various textual data with revenue-based labels with increased accuracy and efficiency. The multi-label classifier may be rapidly trained using a limited, small set of training datasets by implementing two learning stages. The classifiers, in the disclosed embodiments, may be trained by, for example but not limited to, supervised, semi-supervised, and self-supervised machine learning algorithms. The various disclosed embodiments overcome inaccuracies rising from limited datasets and enable rapid training of multi-label classifiers that are specific for certain, for example, domains, industries, companies, and the like.

In an embodiment, the multi-label classifier may be configured to rapidly process textual data, such as but not limited to, emails, text messages, chats, and the like, and simultaneously determine label scores and decisions for all revenue-based labels. The simultaneous identification of all revenue-based labels by the trained multi-label classifier may be performed at similar processing times to that of identifying one revenue-based label. It should be appreciated that enhanced computer efficiency is achieved with the significantly reduced processing time.

It should also be appreciated that the labeled textual data from the multi-label classifier may be presented to a customer to improve efficiency and accuracy of user interactions by enabling faster discovery of certain textual data. The textual data labeled with revenue-based labels are analyzed to generate insights regarding the quality, progress, and stages within the textual communications, and further, for example, of a status of the deal.

Figure 1:
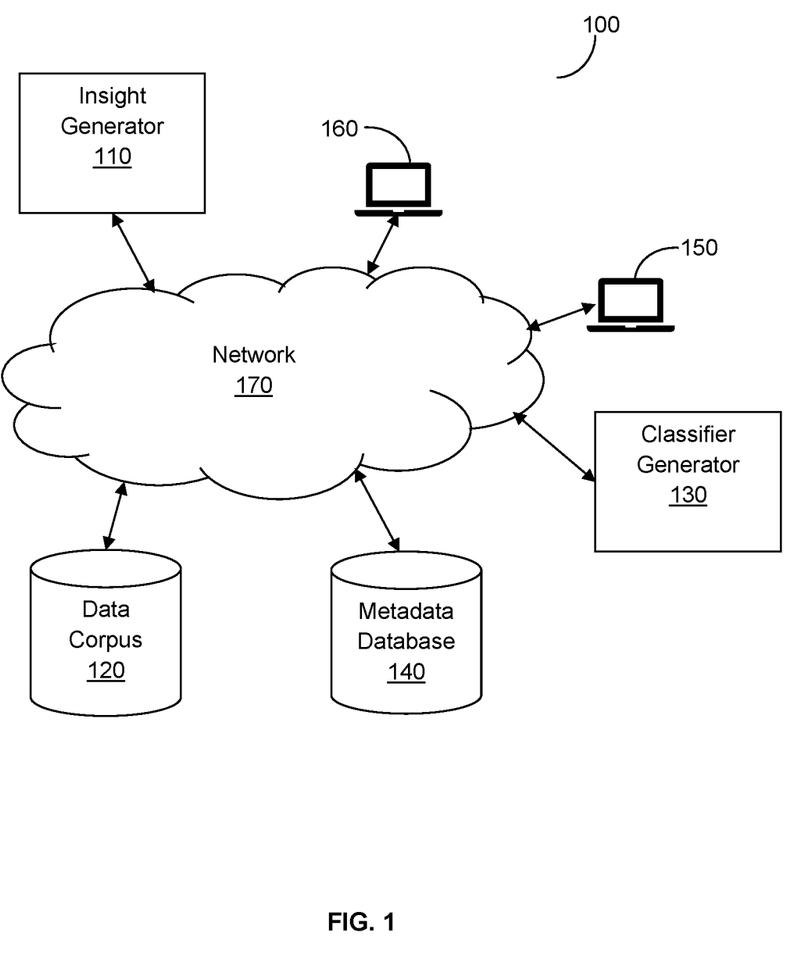
FIG. 1 is a network diagram utilized to describe the various disclosed embodiments.

FIG. 1 shows an example network diagram 100 utilized to describe the various disclosed embodiments. In the example network diagram 100, an insight generator 110, a data corpus 120, a classifier generator 130, a metadata database 140, a user terminal 150, and a customer device 160 connected to a network 170. The network 170 may be, but is not limited to, a wireless, a cellular or wired network, a local area network (LAN), a wide area network (WAN), a metro area network (MAN), the Internet, the worldwide web (WWW), similar networks, and any combination thereof.

The data corpus (or simply "corpus") 120 includes textual data email messages, chat messages, instant messages, short message systems (SMS), chat logs, and other types of textual documents. In an example embodiment, the textual data in the corpus 120 include communication records, such as email communications with customers. As an example, the textual data may include sales-related communication with a company and their customers. The corpus 120 provides textual data to the insight generator 110 and the classifier generator 130 over the network 170. In further embodiment, the data corpus 120 may include revenue-based labels associated with each of the textual data as determined by the classifier generator 130. In an example embodiment, textual data with revenue-based labels may be retrieved by the insight generator 110 for further analysis such as, but not limited to, generating notification, alerts, revenue forecasting, and the like. In an embodiment, the corpus 120 may include a plurality of isolated groups of textual data that are grouped according to customers (or tenants), so that one isolated group may include textual data related to one customer. The isolated groups of textual data may prevent mix-up of textual data between customers to ensure privacy.

The metadata database 140 may include metadata on textual data of, for example, emails, transcribed calls, and the like, stored in the corpus 120. In an embodiment, metadata may include associated information of the textual data such as, but not limited to, participants' information, time stamp, and the like. In further embodiment, metadata may include information retrieved from customer relationship management (CRM) systems or other systems that are utilized for keeping and monitoring deals. Examples of such information includes participants of the textual data, a stage of a deal, date stamp, and so on. The metadata may be used in training of the labeling model.

The user terminal 150 is a device, component, system, or the like, configured to provide input, such as but not limited to, a training dataset, the plurality of revenue-based labels, a plurality of threshold values for the revenue-based labels, and the like. In the training phase, the user terminal 150 may be used to confirm revenue-based labeling from the classifier generator 130 and introduce additional training datasets for existing and/or new labels. Moreover, the threshold values for each of the labels, and associated labeling models in the classifier generator 130, may be modified through the user terminal 150. In an embodiment, the user terminal 150 may include, but not limited to, a personal computer, a laptop, a tablet computer, a smartphone, a wearable computing device, or any other device capable of receiving and displaying textual data. The user terminal 150 may enable trainer access to the classifier generator 130 and/or the insight generator 110.

The classifier generator 130 is configured to create a plurality of classifiers to label the textual data stored in the corpus 120 as revenue-based labels. The classifier generator 130 includes one or more single-label classifiers that are generated and trained to each identify one specified revenue-based label for the textual data. Each single-label classifier generated for the specified label takes in textual data as input to output a binary label indicating relevance (label or no label) based on a label score (or classification score) above a predefined threshold value. In an embodiment, the one or more single-label classifiers may be used to generate and train a multi-label classifier that concurrently identifies one or more revenue-based labels for the textual data. The multi-label classifier is further trained to determine a label score (or classification score) for each revenue-based label and simultaneously output one or more revenue-based label for the textual data. In an example embodiment, the revenue-based labels may provide information associated with certain sales statuses such as, but not limited to, deal rejection, pricing, customer contact information, meeting scheduling, out-of-office messaging "OOO", legal information, and more. In an embodiment, the types of revenue-based labels may be predetermined and modified. In a further embodiment, the multi-label classifier may be trained to suggest additional revenue-based labels that are not predetermined.

In an embodiment, the classifier generator 130 is configured to determine the context of the textual data by applying at least one algorithm, such as a deep learning machine learning algorithm. The context indicates the subject matter (or content) of the textual data, which may be determined for the overall text, portions, paragraphs, and the like. In an embodiment, the context of the textual data may be represented using contextual vector embedding techniques. In an embodiment, the textual data may include one or more contexts which may be utilized to identify the at least one revenue-based label using the multi-label classifier.

All classifiers, single-label classifiers and multi-label classifiers, configured in the classifier generator 130 can have a learning mode and an identification mode, where the learning mode may include training of the classifiers by applying an algorithm, such as a supervised machine learning algorithm, a semi-supervised machine learning algorithm, and a self-supervised machine learning algorithm using the training datasets. The machine learning algorithms used for training may include, for example, a k-nearest neighbors (KNN) model, a gaussian mixture model (GMM), a random forest, manifold learning, decision trees, support vector machines (SVM), decision trees, label propagation, local outlier factor, isolation forest, neural networks, a deep neural network, and the like.

As an example, a textual data, for example an email communication, may state "please remove me from your list" or "unfortunately we don't have budget for this feature." In such cases, the context of textual data may be identified as disinterest on the discussed sales product, and the textual data may be labeled with a "rejection" revenue-based label, which in return could suspend or terminate the sales process for the respective product and client or any other action which is custom to a specific sales organization. It should be noted that the output of the classifier generator 130 may be used to determine labeled textual data that may be presented to a customer through the customer device 160.

The classifier generator 130 may be realized as a physical machine (an example of which is provided in FIG. 6), a virtual machine (or other software entity) executed over a physical machine, and the like.

The customer device 160, may be, but is not limited to, a personal computer, a laptop, a tablet computer, a smartphone, a wearable computing device, or any other device capable of receiving and displaying textual data. In an embodiment, the customer device 160 is used to present and display the labeled textual data, for example but not limited to, emails, text messages from short message service (SMS) and applications, chat logs, and more that are identified using the multi-label classifier configured in the classifier generator 130. In an embodiment, the customer may interact with the labeled textual data or any output such as, but not limited to, suggestions, alerts, and the like, generated upon labeling of the textual data via a graphical user interface presented on the customer device 160. The graphical user interface may display the labeled textual data in, for example, a timeline format with respect to companies, senders, or the like, associated goals, and more.

The insight generator 110 is configured to analyze the labeled textual data to generate insights. In an embodiment, the textual data may be matched with metadata of the textual data, stored in the metadata database 140, in order to determine insights of the respective textual data. The insight generator 110 may be configured to present suggestions and/or orders of certain actions in association to the determined insights. As an example, a notification may be sent to set a reminder to follow-up next month when the textual data is labeled as "out of office (OOO)." As another example, an alert may be generated and caused to be displayed at the customer device 160 when the textual data, for example an email, is identified as the "rejection" label. In further example embodiments, the identified and stored textual data may be analyzed to generated sales insights such as, but not limited to, missing information, deal progress, deal forecasting, and the like. The insight generator 110 may be realized together with the classifier generator 130.

It should be noted that the elements and their arrangement shown in FIG. 1 are shown merely for the sake of simplicity. Other arrangements and/or a number of elements should be considered without departing from the scope of the disclosed embodiments. For example, the insight generator 110, the corpus 120, classifier generator 130, and the user terminal 150 may be part of one or more data centers, server frames, or a cloud computing platform. The cloud computing platform may be a private cloud, a public cloud, a hybrid cloud, or any combination thereof.

Figure 2:
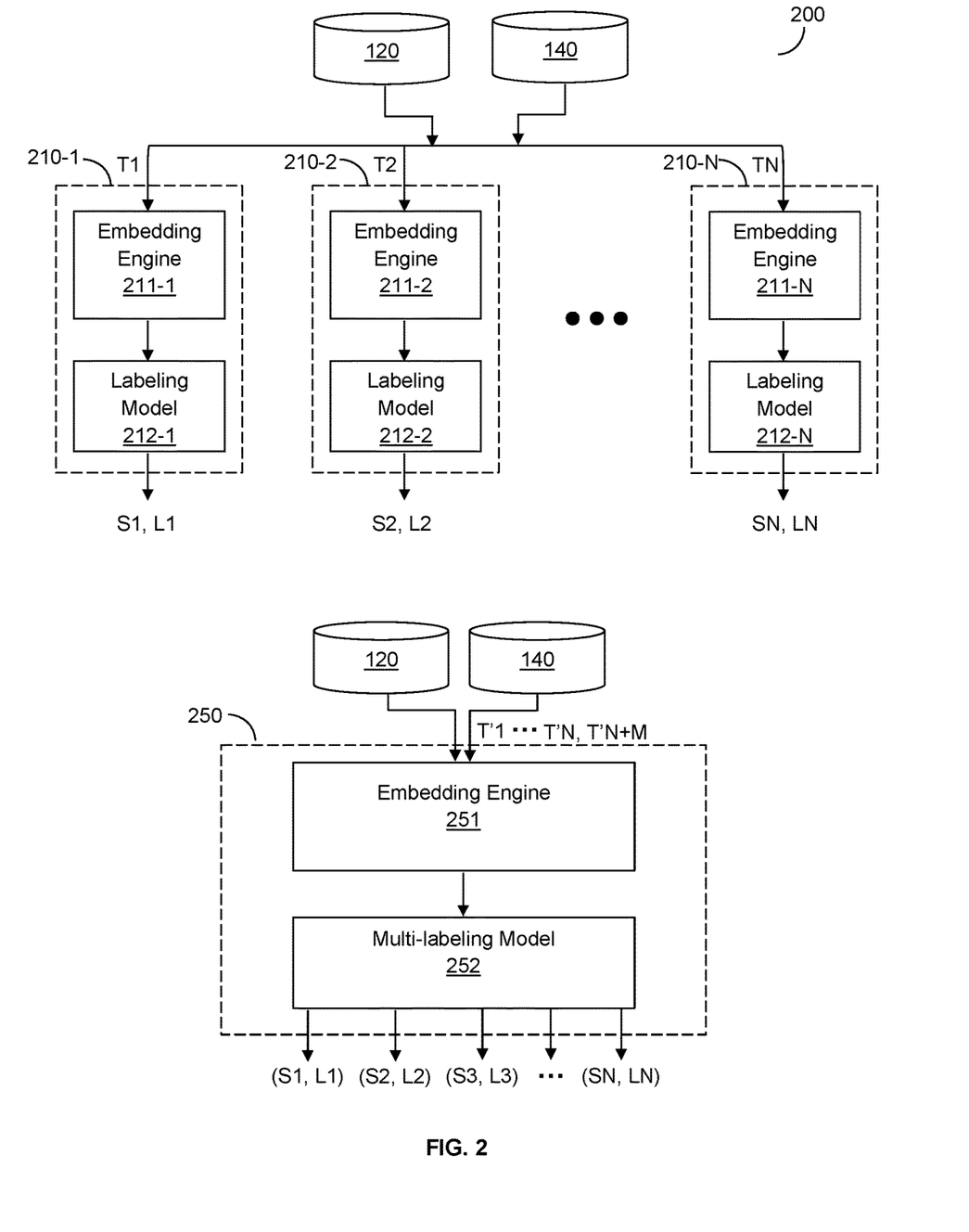
FIG. 2 is a flow diagram illustrating the generation and training of the multi-label classifier according to an embodiment.

FIG. 2 is an example flow diagram 200 illustrating the generation and training of the multi-label classifier 250 according to an embodiment, The flow diagram 200 herein may be performed within the classifier generator 130, FIG. 1. For simplicity and without limitation of the disclosed embodiments, FIG. 2 will also be discussed with reference to the elements shown in FIG. 1.

The flow diagram 200 presents operation in the learning phase, where the multi-label classifier is trained to classify textual data to output revenue-based labels and their respective scores. The learning phase includes two separate learning stages of 1) the plurality of single-label classifiers (e.g., 210-1 through 210-N) and 2) a unified multi-label classifier (e.g., 250). In an embodiment, the classifiers, in general, are text classifiers based on language models, such as but not limited to, embedding from language model (ELMo), bidirectional encoder representations from transformers (BERT), and the like, as embedding engines to output vector representations of textual data.

Each classifier also includes a neural network layer, e.g., a labeling model, to generate a classification score (or label score) and further identify a revenue-based label for the textual data. In an embodiment, the classifier may be generated as a binary label classifier to output a label or no label decision for the input textual data or a continuous score classifier depicting relevance to a "label". Once the classifiers are trained, textual data may be retrieved from the corpus 120 and/or metadata database 140 and input into the multi-label classifier 250, to identify at least one revenue-based label of the input textual data. In an embodiment, the textual data may include, for example but not limited to, an entire text as a whole, paragraphs, sentences, and the like. The metadata is retrieved from the metadata database 140 and may include a specific time stamp for when the communication, email for example, was received, participants in the communication, their locations, the topic of any other information from a CRM system associated with the communication, or information associated with the communication.

According to the disclosed embodiments, the first learning stage to train the plurality of single-label classifiers 210-1 through 210-N (hereinafter referred to individually as a single-label classifier 210 and collectively as single-label classifiers 210, merely for simplicity purposes) is performed separately for each revenue-based label. That is, an individual single-label classifier 210 may be created and trained to identify one type of revenue-based labels out of a predetermined number of labels (e.g., N number of revenue-based labels). The revenue-based labels may be predetermined by, for example, a training personnel through the user terminal (e.g., the user terminal 150, FIG. 1). The revenue-based labels may include, for example and not limited to, rejection, pricing, contact information, technical issue, and more.

As illustrated in FIG. 2, each single-label classifier 210-1 through 210-N includes an embedding engine 211 (211-1 through 211-N) and a single labeling model 212 (212-1 through 212-N) to receive a training dataset T1 through TN and output a specific revenue-based label L1 through LN and a score S1 through SN. Here, the single-label classifiers 210 may be trained using, for example but not limited to, a supervised machine learning algorithm. In an embodiment, the output of textual data labeled with specific revenue-based labels L1 through LN and scores S1 through SN may be stored in a memory and/or the corpus 120.

In an embodiment, the embedding engine 211-1 may receive a training dataset T1 including textual data, such as an email, and output a contextual vector representation of the textual data. The training dataset T1 may include both relevant (or positive) and irrelevant (or negative) textual data with respect to the specific label, L1. The input textual data from, for example but not limited to, the corpus 120, the metadata database 140, and the user terminal 150, may be a sentence, a paragraph, and the like, and any combination thereof. As an example, contextual vector representation using the embedding engine 211-1 may result close vector outputs for "I'm happy to discuss usage pricing with you" and "Attached below is the initial cost estimate". As another example, very distinct contextual vector embedding values may be determined for the sentence "I would like to discuss the licensing cost with you" and the phrase "at the cost of losing customers" even though the same word "cost" is used, due to different contextual usages. It should be noted that the training datasets typically include complete email messages or full paragraphs and not short sentences demonstrated above. Such emails are labeled for the corresponding required output label (L1 through LN).

In further embodiment, the contextual vector output of the training dataset T1 from the embedding engine 211-1 may be used as an input for the labeling model 212-1 to generate a label score, for example, between 0 and 1, which is compared to a predefined threshold value to label or not label the textual data with the specific revenue-based label. It should be noted that the score may be represented on a different scale.

In an embodiment, training of the single-label classifier 210-1 is recursively performed using multiple textual data in the training dataset T1 until the single-label classifier 210-1 is well-trained for the specific revenue-based label, L1. Training of each single-label classifiers 210 using the training dataset is separately performed for each revenue-based label (e.g., N number of labels) in the same manner as illustrated herein above. It should be noted that training of the single-label classifier 210 fine tunes the embedding engine 211 to effectively vectorize textual data according to specified contexts of the training dataset and further optimizes the parameters (e.g., weights, etc.) for accurate classification and labeling of textual data.

It should be noted that the embedding engines illustrated as 211-1 through 211-N may be one embedding engine 211 that is separately trained by all the training datasets T1 through TN in the single-label classifiers 210. That is, the embedding engine 211 may be trained by all, e.g., N number of, revenue-based labels. It should be noted that additional revenue-based labels may be introduced to the classifier generator 130 by creating and training a separate single-label classifier without disturbing the prior trained single-label classifiers of other pre-existing revenue-based labels.

As an example of the first learning stage, training of two single-label classifiers for revenue-based labels "pricing" and "OOO" is presented. Training datasets, Tp and To, for "pricing" and "OOO", respectively, are shown below. The training datasets may include textual data that are relevant (or positive) or irrelevant (or negative) with respect to the revenue-based labels and labeled accordingly. In an example embodiment, the training datasets Tp and To may each be input into separate single-label classifiers to generate and train one single-label classifier for the "pricing" label and one single-label classifier for the "OOO" label. It should be noted that sentences are shown for illustrative purposes and does not limit the disclosed embodiments. The textual data input in the single-label classifiers may be paragraphs or entire communication, such as an email.

TABLE 1

| Training Dataset | Textual data | Label |
| --- | --- | --- |
| Tp | Attached below is the initial cost estimate | "pricing" |
| | Please let me know if you have any questions | "not pricing" |
| | I will be on vacation until end of the month | "not pricing" |
| To | I would like to discuss the licensing cost with you | "not OOO" |
| | I'm going to Hawaii next week | "OOO" |

According to the disclosed embodiments, at the second learning stage, a multi-label classifier 250 is trained based on the labels created by single-label classifiers 210 created and trained in the first learning stage. The multi-label classifier 250 includes an embedding engine 251 that takes in labeled training datasets, of textual data, from, for example, the corpus 120, metadata database 140, and the like, to output contextual vector representations. In an embodiment, the labeled training datasets T'1 through T'N may be generated by processing through all trained single-label classifiers 210 to include textual data of the training datasets T1 through TN, each with scores and decisions for the multiple revenue-based labels (e.g., N revenue-based labels).

In an embodiment, the multi-label classifier 250 includes a multi-labeling model 252 that joins the plurality of single-labeling models 212 to simultaneously identify one or more revenue-based labels for the input textual data through a single processing. In such scenario, the output of the multi-label classifier 250 may include a vector having multiple label scores and binary decisions for the set of predetermined revenue-based labels. An example format of the vector output of the multi-label classifier is shown below:

$$\begin{pmatrix} S1 & L1 \\ S2 & L2 \\ \dots & \dots \\ SN & LN \end{pmatrix}$$

In an embodiment, one or more revenue-based labels may be identified upon determination that the label score is greater than a predefined threshold value for each of the revenue-based labels. In an embodiment, the predefined threshold value may be determined and modified separately for each of the predetermined revenue-based labels by, for example but not limited to, the user terminal 150.

It should be noted that multi-labeling model 252 configured in the multi-label classifier 250 enables rapid processing of input textual data similar to that of one single-label classifier 210 by concurrently analyzing for the multiple predetermined revenue-based labels and outputting the vector of multiple label scores and decisions on the labels (e.g., (S1, L1) through (SN, LN)). It should be appreciated that the processing speed and cost for identifying multiple revenue-based labels using the multi-label classifier 250 remain relatively unchanged with respect to identifying a single revenue-based label using the single-label classifier 210.

According to the disclosed embodiments, the generated multi-label classifier 250 may be further trained using labeled training datasets T'1 through T'N by applying at least an algorithm such as, but not limed to, a semi-supervised machine, a self-supervised machine learning algorithm, and the like. In an embodiment, the labeled training datasets T'1 through T'N may be identified by combining the outputs from each of the plurality of trained single-label classifiers 210 in the first learning stage. In an embodiment, each training set, for example T1, may be input into all the trained single-label classifiers 210 and processed multiple times for scores and binary decisions on all revenue-based labels. That is, the training dataset, for example T'1, may include textual data, of T1, each with a vector output, similar to that of the multi-label classifier shown above, having N classifier scores and binary decisions obtained from all the single-label classifiers 210. In an embodiment, the labeled training datasets T'1 through T'N may be automatically generated for the plurality of textual data in the training datasets T1 through TN that are not pre-label when input into the single-label classifiers 210 and labeled with predetermined revenue-based labels after classification by the trained single-label classifiers 210. To this end, training of the multi-label classifier 250 may be performed even with a limited amount of training datasets.

In further embodiment, additional labeled training dataset T'N+M (where M is an integer equal to or greater than 1) that includes textual data previously not included in the training datasets T1 through TN may be introduced to train the multi-label classifier 250. The additional labeled training dataset T'N+M may be labeled manually or using all single-label classifiers 210. It should be noted that such additional labeled training dataset may further improve performance accuracy of the multi-label classifier 250.

As an example, labeled training datasets automatically generated by the trained single-label classifiers and utilized for multi-label classifier training is presented below, following the same examples used herein above. The two training datasets Tp and To may be input into both single-label classifiers to generate labeled training datasets T'p and T'o, respectively, for revenue-based labels "pricing" and "OOO". As depicted below, the same textual data of the training datasets Tp and To are associated with combined label decisions for both "pricing" and "OOO" as determined by each single-label classifier. In addition, new additional labeled training dataset T'n that includes textual data not used for training the single-label classifiers may be generated utilizing the two trained single-label classifiers. Again, the textual data in the labeled training dataset T'n have label decisions for both "pricing" and "OOO" labels as determined by each single-label classifier. In an example embodiment, the generated labeled training datasets T'p, T'o, and T'n may be utilized to train the multi-label classifier to identify both "pricing" and "OOO" revenue-based labels accurately and efficiently. It should be noted that sentences are shown for illustrative purposes and does not limit the disclosed embodiments. The textual data input in the single-label classifiers may be paragraphs or entire communication, such as an email.

TABLE 2

| Training Dataset | Textual data | Label |
|---|---|---|
| T'p | Attached below is the initial cost estimate | "pricing, not OOO" |
| | Please let me know if you have any questions | "not pricing, not OOO" |
| | I will be on vacation until end of the month | "not pricing, OOO" |
| T'o | I would like to discuss the licensing cost with you | "not OOO, pricing" |
| | I'm going to Hawaii next week | "OOO, not pricing" |
| T'n | Please remove me from the list | "not pricing, not OOO" |
| | Please send me a price quote for 5 licenses | "pricing, not OOO" |

In an embodiment, training of the multi-label classifier 250 may be repeated and iteratively performed until the multi-label classifier 250 is well trained to output high score (e.g., close to 1) for textual data deemed relevant to the respective revenue-based labels and low scores (e.g., close to 0) for textual data considered irrelevant to the respective revenue-based labels.

It should be noted that the plurality of single-label classifiers 210 and the multi-label classifier 250 can be realized as or executed by as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Figure 3:
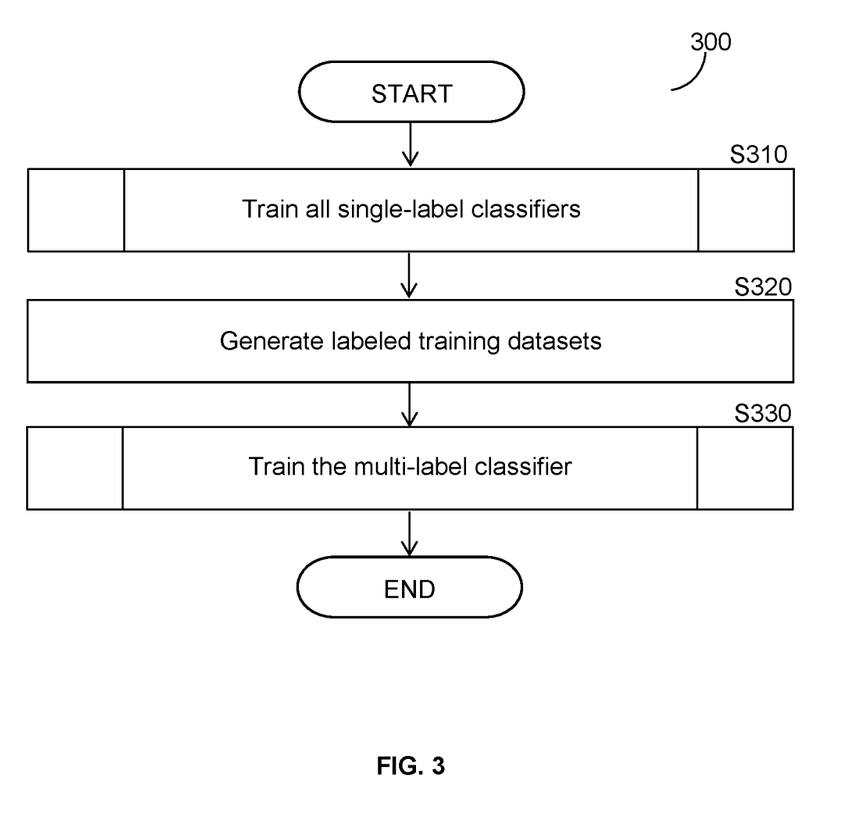
FIG. 3 is flowchart illustrating a method for generating a multi-label classifier according to an embodiment.

FIG. 3 is an example flowchart 300 illustrating a method for generating and training a multi-label classifier according to an embodiment. The method described herein may be executed by the classifier generator 130, FIG. 1. In some example embodiments, the classifier may be realized using a neural network, a deep neural network programmed, to run, for example, a supervised learning, a semi-supervised learning, and a self-supervised learning.

At S310, all single-label classifiers are trained. A single-label classifier is created for a specific revenue-based label out of predetermined revenue-based labels. In an embodiment, the single-label classifiers are created and trained separately from one another to determine relevance of input textual data to the specific revenue-based label. The revenue-based label of the textual data may be identified upon determination that the label score, indicating contextual relevance and generated by the single-label classifier, is greater than a predefined threshold value. The methods of training the single-label classifiers are described further below in FIG. 4.

In an embodiment, training of each single-label classifier may be performed by applying at least an algorithm, such as a supervised machine learning algorithm, a semi-supervised machine learning algorithm, and the like. It should be noted that training of the multiple single-label classifiers may be performed in parallel, that is simultaneously at the same time, using a separate set of training data and classifier configuration.

At S320, labeled training datasets for a multi-label classifier are generated based on the labeling by previously trained single-label classifiers. The labeled training datasets includes textual data such as, but not limited to emails, SMS, chat log, and the like, that are labeled by the plurality of the trained single-label classifiers. Each textual data may have scores and binary decisions for all the predetermined revenue-based labels that are output from each single-label classifier and combined thereafter. In an embodiment, the labeled training datasets may include textual data from training datasets previously used for training the single-label classifiers. In further embodiment, the labeled training datasets may include new training datasets that were not previously used for training single-label and/or multi-label classifiers. In an embodiment, the labeled training dataset may be associated with at least one revenue-based label as determined by at least one single-label classifier. In another embodiment, the labeled training dataset may not include any revenue-based labels if determined not to label based on applying the single-label classifier.

At S330, the multi-label classifier is trained using the generated labeled training datasets. The multi-label classifier is configured to process input textual data to generate a label score for each of the predetermined revenue-based labels in which the single-label classifiers were trained to classify (S310). It should be noted that generation of the label scores are performed at the same time without multiple processing of the input textual data. In an embodiment, the output of the multi-label classifier may be configured as a vector of label scores and binary decisions of all the revenue-based labels. In an embodiment, by implementing the trained single-label classifiers, the multi-label classifier may already be fine-tuned for determining contexts of certain tasks such as, but not limited to, company, topic, industry type, and the like, and any combination thereof.

In an embodiment, at least one algorithm, such as but not limited to, semi-supervised and self-supervised machine learning algorithm, may be applied to train the multi-label classifier. In an embodiment, the multi-label classifier may be trained until the generated label scores in the output vectors display high score (close to 1) and low score (close to 0) for textual data that are relevant and irrelevant to the respective revenue-based labels, respectively. In an embodiment, the decision to stop training may be determined by, for example but not limited to, a user of the user terminal (e.g., the user terminal 150, FIG. 1), after a predefined number of iterations is completed, after achieving an error lower than a predefined error range, and the like, and any combination thereof.

In an embodiment, the multi-labeling model (e.g., the multi-labeling model 252, FIG. 2) may incorporate optimized (or learned) parameters from each of the single labeling models (e.g., the labeling models 212, FIG. 2), to generate a mildly trained multi-label classifier prior to actual training in S330. That is, the multi-label classifier training may start with learned parameters that are closer to target parameters (i.e., achieved in well-trained state) rather than training from random and/or unknown parameters for classifying and labeling input textual data. To this end, it should be appreciated that the turnaround time for training of the multi-label classifier, according to the disclosed embodiments, may be shorter compared to training from ground up without the first learning stage by single-label classifiers.

Figure 4:
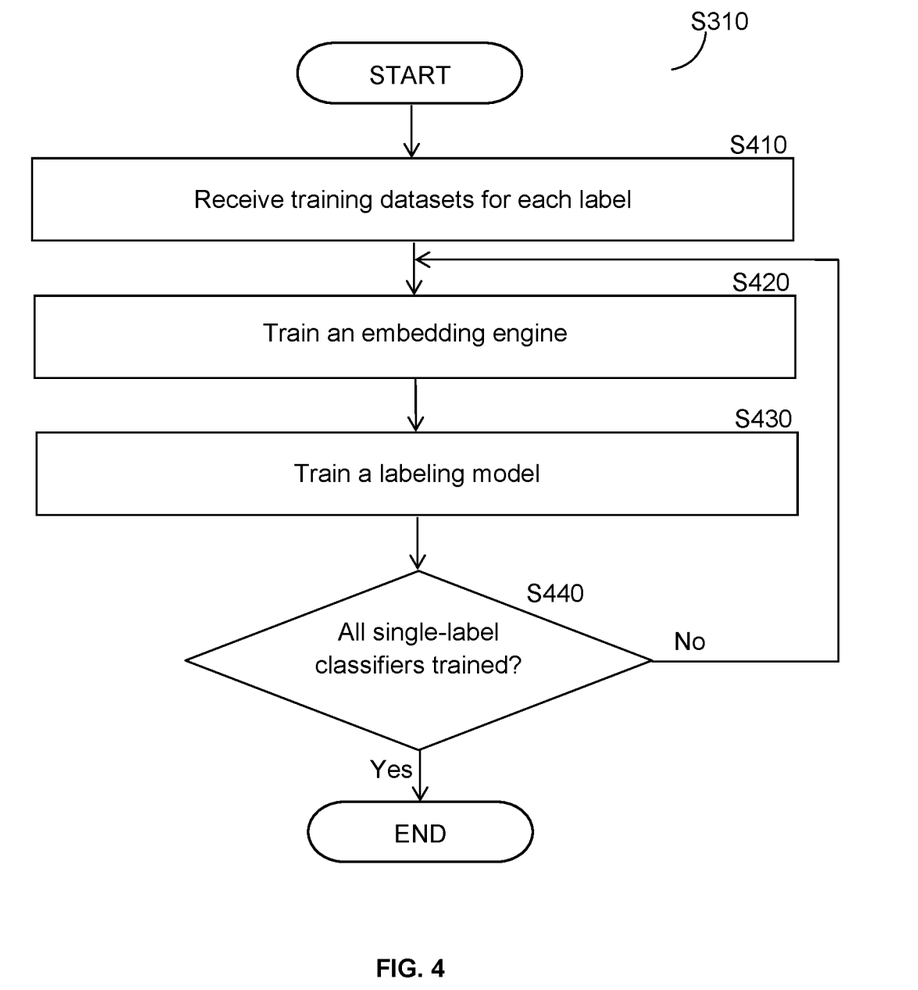
FIG. 4 is a flowchart illustrating a method for training all single-label classifiers according to an embodiment.

FIG. 4 is an example flowchart S310 illustrating a method for training all single-label classifiers according to an embodiment. The method described herein may be performed for each single-label classifier 210 including, but not limited to, an embedding engine 211 and a labelling model 212, FIG. 2.

At S410, training datasets are received for each revenue-based label. A separate single-label classifier is created for each of the predetermined revenue-based labels. In an embodiment, the training dataset includes textual data such as, but not limited to, emails, SMS, slack messages, chat logs, and the like, and respective revenue-based labels. In an embodiment, the training dataset may be received from the corpus (e.g., 120, FIG. 1) and the metadata database (e.g., 140, FIG. 1). In another embodiment, the training dataset may be provided through the user terminal (e.g., 150, FIG. 1). In yet another embodiment, textual data may be received without the associated revenue-based labels and the labels may be designated after processing, using the user terminal (e.g., 150, FIG. 1).

At S420, the embedding engine is trained for each revenue-based label. The textual data from the training dataset may be tokenized as, for example but not limited to, whole text, paragraphs, sentences, and the like, for input and training of the embedding engine. In an embodiment, the embedding engine may output a contextual vector embedding for each token and/or a contextual vector for the whole text to represent the context (or content) of the input textual data. Training using the training dataset associated with a particular area and/or task may fine tune the embedding engine to vectorize textual data to recognize and thus, output similar vector values of the particular area, such as but not limited to, industry, department, task, field, company, and the like. The vector embedding technique that can be utilized by the embedding engine may include, but not limited to, embedding from language model (ELMo), bidirectional encoder representation of transformers (BERT), and the like.

At S430, the labeling model is trained for each revenue-based label. A contextual vector embedding value of the textual data determined by the embedding engine is received as an input of the labeling model. In an embodiment, at least one algorithm, such as but not limited to, a classification algorithm may be applied to the vector embedding to output a decision indicating relevance to the specific revenue-based label of the single-label classifier. In an embodiment, a label score between 0 and 1 representing irrelevance and relevance to the specific revenue-based label, respectively, may be generated for the classification. The input textual data may be identified as the specified revenue-based label upon determination that the label score is greater than a predefined threshold value, and not identified as the specific label otherwise. In an embodiment, the predefined threshold value may be provided and/or updated to maximize performance metrics using, for example, the user terminal (e.g., the user terminal 150, FIG. 1). The predetermined revenue-based labels in the training dataset may be used to train classification, for example binary classification, by the labeling model.

At S440, a check is performed whether all single-label classifiers are trained, each for a specific label from the predetermined revenue-based labels. If so, the execution ends; otherwise, the execution returns to S420 and continues training. It should be noted that the embedding engine and the labeling model in the single-label classifier are trained together, consecutively, to receive the training dataset as input and output the label score and binary decision of the specific revenue-based label it is trained for.

The method of FIG. 4 terminates once all the created single-label classifiers are well trained. In an embodiment, a well-trained single-label classifier outputs label scores close to 1 indicating relevance of the input textual data to the revenue-based labels. In an embodiment, the decision to stop training may be received from a user, for example through the user terminal (e.g., the user terminal 150, FIG. 1), or taken after a predefined number of iterations of training.

In an embodiment, the trained single-label classifiers are separately used to generate label scores and identify specific revenue-based labels for other textual data. In further embodiment, labeled training datasets may be created using such automatic labeling by the single-label classifiers. The automatically labeled training datasets may then be applied to train the multi-label classifier. It should be noted that the generation of labeled training datasets overcomes limitations set by the amount of training data available, and thus, enabling effective training of the multi-label classifier to accurately identify a plurality of revenue-based labels based on relatively smaller set of training data.

Figure 5:
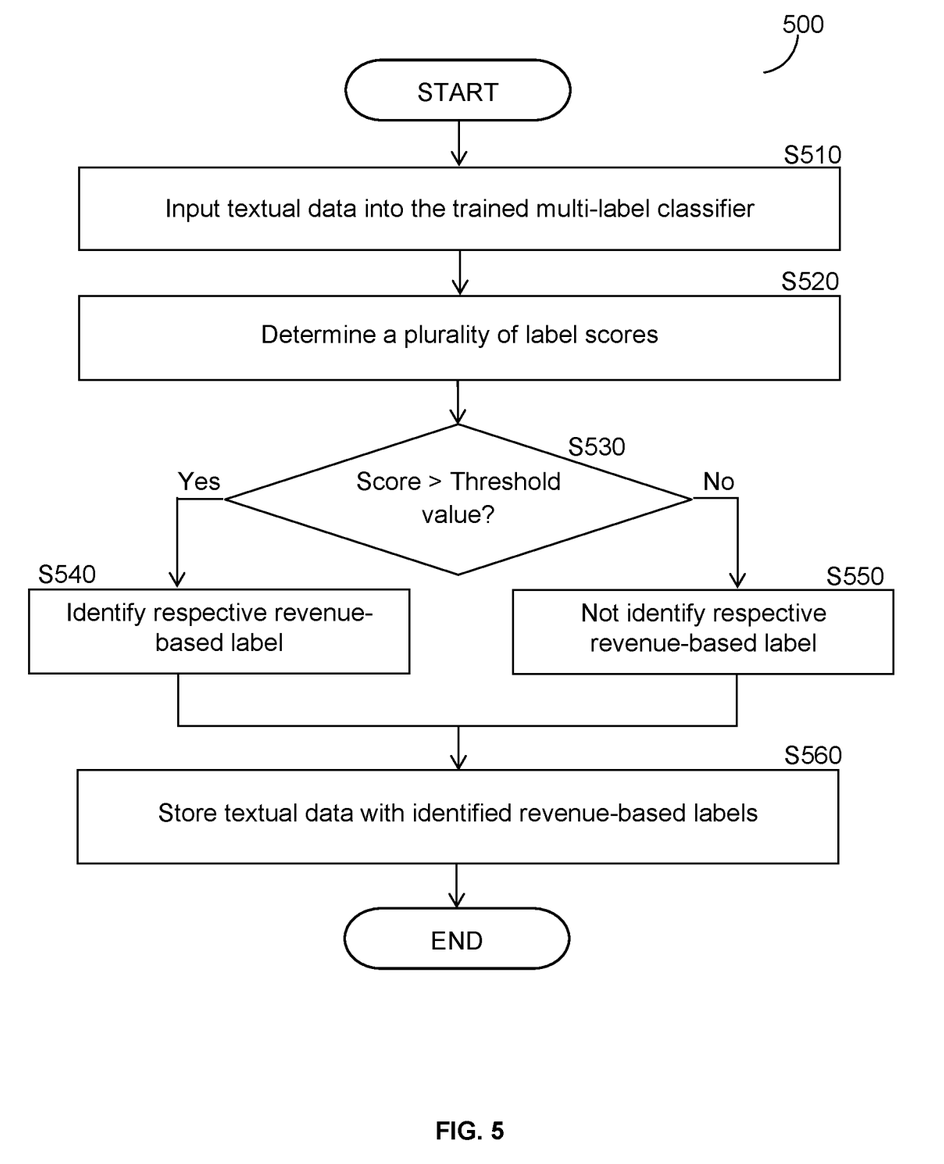
FIG. 5 is a flowchart illustrating a method for determining revenue-based labels of textual data according to an embodiment.

FIG. 5 is an example flowchart 500 illustrating a method for determining revenue-based labels of textual data according to an embodiment. The method described herein may be executed by the classifier generator 130, FIG. 1.

At S510, the textual data is input into a trained multi-label classifier. The textual data is tokenized to, for example, a sentence, a paragraph, and the like, for input into the multi-label classifier. In an embodiment, textual data may be received from the corpus and the metadata database (e.g., the corpus 120 and the metadata database 140, FIG. 1). In an example embodiment, each textual data may include a single text document and associated metadata of the text document that is extracted from communications between participants of the communication. The textual data may be for example, without limitation, email messages, electronic messages over Short Message Systems (SMS) and applications, and more. In another embodiment, the textual data may be retrieved directly from an email server (not shown).

At S520, a plurality of label scores is determined. One label score (or classification score) is determined for each and every one of the predetermined revenue-based labels that the multi-label classifier is trained to identify. In an embodiment, the plurality of label scores may be simultaneously determined by the multi-label classifier by processing the input textual data. That is, the plurality of label scores is determined at the same time without multiple processing for each of the revenue-based labels. The label score is a probability that defines the likelihood that the textual data relates to the specific revenue-based label.

At S530, each label score of each output revenue-based label is compared to the predefined threshold value. The comparison is performed for all the predetermined revenue-based labels trained to be identified by the multi-label classifier. In an embodiment, one-to-one comparisons of the label score and the predefined threshold value are performed within the respective revenue-based labels. As an example, the label score for the "rejection" revenue-based label is compared to the threshold value for the "rejection" revenue-based label. Upon determination that the label score is greater than the predefined threshold value, the operation continues to S540. Otherwise, the operation continues to S550. As noted above, the predefined threshold value may be determined and/or modified by a user through, for example, the user terminal 150, FIG. 1. The predefined threshold value may be updated to reduce false labeling, excess labeling, or the like, that may result information loss.

At S540, the respective revenue-based labels are identified and stored for the revenue-based labels that have label scores greater than the predefined threshold value.

At S550, the respective revenue-based labels are determined not identified and decision is stored.

At S560, the decisions for all the revenue-based labels are collected for the textual data and stored. The output of the multi-label classifier for the input textual data may be a vector including label scores and labeling decisions for each of the plurality of revenue-based labels. In an embodiment, the output may be stored in a memory. In another embodiment, the output may be stored in the corpus and the metadata database (e.g., the corpus 120 and the metadata database 140, FIG. 1). In an optional embodiment, valid textual data and labels determined by the multi-label classifier may be used to re-train the classifiers through the two learning stages.

In an embodiment, an input textual data may be identified as one or more labels, and thus labeled with multiple revenue-based labels. As an example, an email communication may have label scores of 0.9, 0.6, and 0.2 for revenue-based labels "scheduling," "legal," and "contact info," respectively. In the same example, predefined threshold values for the revenue labels "scheduling," "legal," and "contact info" may be 0.8, 0.5, and 0.8, respectively. In such scenario, the email communication may be identified with labels of "scheduling" and "legal," by comparing the respective label scores and the predefined threshold values. In further embodiment, an input textual data may be determined not to include any of the predefined revenue-based labels by applying the rules of the multi-label classifier as disclosed.

In an embodiment, the labeled textual data by the multi-label classifier may be matched with the textual data's metadata to generate insights. The generation of insights regarding the labeled textual data may be performed in the insight generator (e.g., the insight generator 110, FIG. 1). In an embodiment, at least an algorithm may be applied to the stored labeled textual data for display to a customer via a graphic user interface (GUI) on a customer device (e.g., customer device 160, FIG. 1).

In an example embodiment, the generated insight may be prompt a notification to be presented to the customer. As an example, when a textual data, for example an email, is received and labeled as the "rejection" revenue-based label, an alert may be projected to the customer in order to quickly address the sender's needs to change the decision or to terminate the process immediately. As another example, when a textual data is received and labeled as the "legal" revenue-based label, a notification including a checklist of information or documents to prepare for finalizing the contract may be generated and presented to the customer. In another example embodiment, specific actions may be associated with certain revenue-based labels. For example, when a textual data is labeled as the "scheduling" revenue-based label, the customer's calendar may be automatically opened to set up a reminder for a meeting on the calendar.

Figure 6:
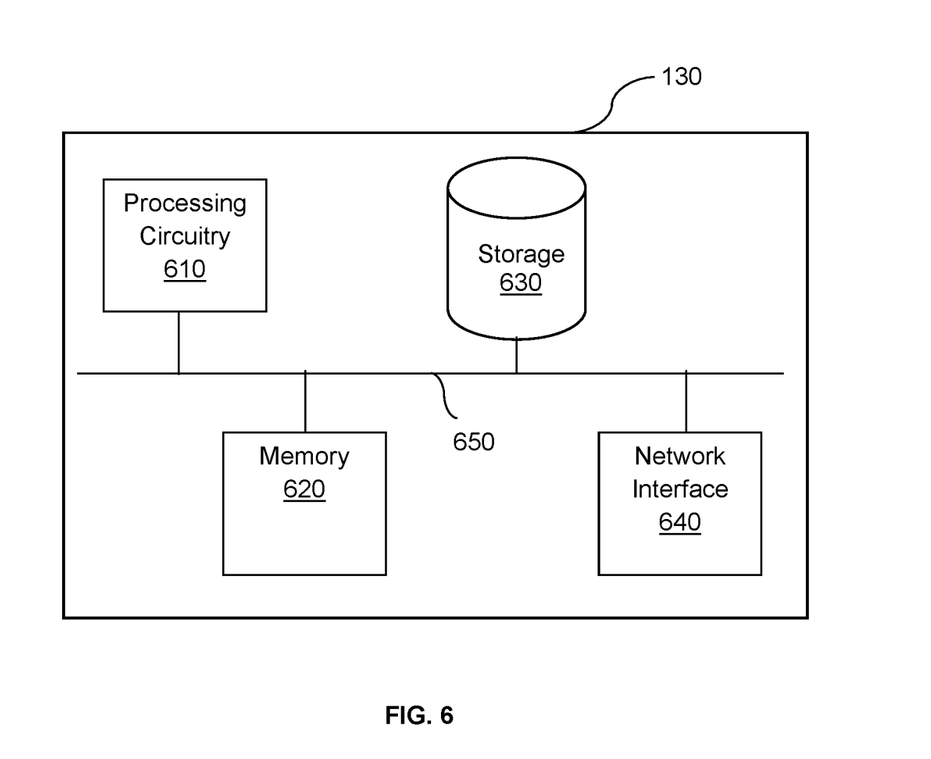
FIG. 6 is a schematic diagram of a classifier generator according to an embodiment.

FIG. 6 is an example schematic diagram of a classifier generator 130 according to an embodiment. The classifier generator 130 includes a processing circuitry 610 coupled to a memory 620, a storage 630, and a network interface 640. In an embodiment, the components of the classifier generator 130 may be communicatively connected via a bus 650. In an embodiment, the classifier generator 130 and the insight generator 110 may be configured together in a single component, device, server, and the like. Further, the insight generator 110 may be structured to include the elements shown in FIG. 6.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose central processing units (CPUs), microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the classifier generator 130 to communicate with other elements over the network 170 for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), general purpose compute acceleration device such as graphics processing units ("GPU"), a memory, and input/output interfaces. The computer platform may also include an operating system and microinstruction code. The various processes and functions described herein may be either part of the microinstruction code or part of the application program, or any combination thereof, which may be executed by a CPU or a GPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a multi-label classifier of textual data, comprising:
   training a plurality of single-label classifiers, wherein each of the plurality of single-label classifiers is trained to classify textual data to a single predefined revenue-based label, wherein training each of the plurality of single-label classifier further comprises:
   receiving a training dataset for the single predefined revenue-based label, wherein the training dataset includes pre-labeled textual data;
   training an embedding engine using the received training dataset to generate contextual vector embeddings for the pre-labeled textual data; and
   training a labeling model using the training data to output a classification score and a labeling decision with respect to the single predefined revenue-based label for the pre-labeled textual data; and training a multi-label classifier using labeled data output by the plurality of single-label classifiers, wherein the multi-label classifier is trained to classify textual data to a vector including revenue-based labels and their respective classification scores.

2. The method of claim 1, wherein outputting the labeling decision further comprises:

determining a binary labeling decision as label, upon determination that the classification score is greater than a predefined threshold value; and determining a binary labeling decision as no-label upon determination that the classification score is no greater than the predefined threshold value.

3. The method of claim 1, wherein the embedding engine is any one of: a bidirectional encoder representations from transformers (BERT) and an embeddings from language model (ELMo).

4. The method of claim 1, further comprising:

inputting a training dataset of the single predefined revenue-based label to the plurality of single-label classifiers, where the training dataset includes pre-labeled textual data;

determining the classification score and a labeling decision for pre-labeled textual data using each of the plurality of single-label classifiers;

combining the determined plurality of classification scores and the labeling decisions for the pre-labeled textual data to create at least one training vector, wherein the labeled data output includes the pre-labeled textual data and the associated at least one training vector; and iteratively inputting the training dataset of other single predefined revenue-based label to the plurality of single-label classifiers.

5. The method of claim 4, further comprising:

inputting a new training dataset to the plurality of single-label classifiers, wherein the new training dataset includes textual data not introduced for training each of the plurality of single-label classifiers.

6. The method of claim 1, wherein the textual data is any one of: an email, a short message system (SMS), a slack message, and a chat log.

7. The method of claim 1, wherein classifying the textual data to the vector further comprises:

receiving the textual data;

reading textual data using the trained multi-label classifier;

determining the plurality of classification scores for each of the revenue-based labels;

generating the vector including the determined plurality of classification scores and a plurality of labeling decisions for the revenue-based labels, wherein the labeling decision is determined by comparing to a predefined threshold value;

identifying the revenue-based label upon determination that the classification score is greater than the predefined threshold value for each of the respective revenue-based labels; and storing the textual data with the identified revenue-based labels.

8. The method of claim 7, further comprising:

causing a display of the textual data with the identified revenue-based labels via a user device.

9. A non-transitory computer readable medium having stored thereon instructions for causing a processing circuitry to execute a process, the process comprising:

training a plurality of single-label classifiers, wherein each of the plurality of single-label classifiers is trained to classify textual data to a single predefined revenue-based label, wherein training each of the plurality of single-label classifier further comprises:

receiving a training dataset for the single predefined revenue-based label, wherein the training dataset includes pre-labeled textual data;

training an embedding engine using the received training dataset to generate contextual vector embeddings for the pre-labeled textual data; and training a labeling model using the training data to output a classification score and a labeling decision with respect to the single predefined revenue-based label for the pre-labeled textual data; and training a multi-label classifier using labeled data output by the plurality of single-label classifiers, wherein the multi-label classifier is trained to classify textual data to a vector including revenue-based labels and their respective classification scores.

10. A system for generating a multi-label classifier of textual data, comprising:

a processing circuitry; and a memory, the memory containing instructions that, when executed by the processing circuitry, configure the system to:

train a plurality of single-label classifiers, wherein each of the plurality of single-label classifiers is trained to classify textual data to a single predefined revenue-based label, wherein the system is further configured to;

receive a training dataset for the single predefined revenue-based label, wherein the training dataset includes pre-labeled textual data;

train an embedding engine using the received training dataset to generate contextual vector embeddings for the pre-labeled textual data;

train a labeling model using the training data to output a classification score and a labeling decision with respect to the single predefined revenue-based label for the pre-labeled textual data; and train a multi-label classifier using labeled data output by the plurality of single-label classifiers, wherein the multi-label classifier is trained to classify textual data to a vector including revenue-based labels and their respective classification scores.

11. The system of claim 10, wherein the system is further configured to:

determine a binary labeling decision as label, upon determination that the classification score is greater than a predefined threshold value; and determine a binary labeling decision as no-label upon determination that the classification score is no greater than the predefined threshold value.

12. The system of claim 10, wherein the embedding engine is any one of: a bidirectional encoder representations from transformers (BERT) and an embeddings from language model (ELMo).

13. The system of claim 10, wherein the system is further configured to:

input a training dataset of the single predefined revenue-based label to the plurality of single-label classifiers, where the training dataset includes pre-labeled textual data;

determine the classification score and a labeling decision for pre-labeled textual data using each of the plurality of single-label classifiers;

combine the determined plurality of classification scores and the labeling decisions for the pre-labeled textual data to create at least one training vector, wherein the labeled data output includes the pre-labeled textual data and the associated at least one training vector; and iteratively input the training dataset of other single pre-defined revenue-based label to the plurality of single-label classifiers.

14. The system of claim 13, wherein the system is further configured to:

input a new training dataset to the plurality of single-label classifiers, wherein the new training dataset includes textual data not introduced for training each of the plurality of single-label classifiers.

15. The system of claim 10, wherein the textual data is any one of: an email, a short message system (SMS), a slack message, and a chat log.

16. The system of claim 10, wherein the system is further configured to:

receive the textual data;

read textual data using the trained multi-label classifier;

determine the plurality of classification scores for each of the revenue-based labels;

generate the vector including the determined plurality of classification scores and a plurality of labeling decisions for the revenue-based labels, wherein the labeling decision is determined by comparing to a predefined threshold value;

identify the revenue-based label upon determination that the classification score is greater than the predefined threshold value for each of the respective revenue-based labels; and store the textual data with the identified revenue-based labels.

17. The system of claim 16, wherein the system is further configured to:

cause a display of the textual data with the identified revenue-based labels via a user device.

* * * * *